US012571579B2

(12) United States Patent
Hunter et al.

(10) Patent No.: US 12,571,579 B2
(45) **Date of Patent: *Mar. 10, 2026**

(54) REFRIGERATOR WITH HINGE ASSEMBLY HAVING AN EXTERNAL HINGE PIN

(71) Applicant: WHIRLPOOL CORPORATION, Benton Harbor, MI (US)

(72) Inventors: Lynne F. Hunter, Dorr, MI (US); Daniel Lottinville, Stevensville, MI (US); Karen J. Querfurth, Coloma, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,046

(22) Filed: Apr. 24, 2024

(65) Prior Publication Data

US 2024/0271858 A1 Aug. 15, 2024

Related U.S. Application Data

(60) Continuation of application No. 18/202,367, filed on May 26, 2023, now Pat. No. 11,976,874, which is a (Continued)

(51) Int. Cl.

| | |
|---|---|
| ***F25D 23/02*** | (2006.01) |
| ***E05D 3/02*** | (2006.01) |
| ***E05D 5/02*** | (2006.01) |

(52) U.S. Cl.

CPC ............ *F25D 23/028* (2013.01); *E05D 3/02* (2013.01); *E05D 5/02* (2013.01); *E05Y 2900/31* (2013.01); (Continued)

(58) Field of Classification Search

CPC .............. F25D 23/028; F25D 2201/14; F25D 2323/024; E05D 3/02; E05D 5/02; (Continued)

(56) References Cited

U.S. PATENT DOCUMENTS

| | | | |
|---|---|---|---|
| 2,443,516 | A | 6/1948 | Rockwell |
| 3,157,306 | A | 11/1964 | Courson |

(Continued)

FOREIGN PATENT DOCUMENTS

| | | | |
|---|---|---|---|
| FR | 2722827 | A3 | 1/1996 |
| WO | 2016177427 | A1 | 11/2016 |

*Primary Examiner* — Hanh V Tran

(74) *Attorney, Agent, or Firm* — Price Heneveld LLP

(57) ABSTRACT

A refrigerator includes a cabinet and a door with an exposed door frame that extends at least partially about a top panel and opposing side panels of the door. At least one hinge assembly is configured to hinge the door to the cabinet. The at least one hinge assembly includes a mounting block coupled to the top panel. The mounting block is positioned in a cutout of the exposed door frame that is proximate a front panel of the door and is disposed between the opposing side panels. A hinge support bracket is coupled to the cabinet. A hinge bracket is coupled to the hinge support bracket. The hinge bracket includes an upper portion that is vertically offset from a lower portion. A hinge pin is disposed between the mounting block and the upper portion of the hinge bracket.

5 Claims, 9 Drawing Sheets

Related U.S. Application Data division of application No. 17/592,180, filed on Feb. 3, 2022, now Pat. No. 11,662,137, which is a continuation of application No. 16/765,720, filed as application No. PCT/US2017/062576 on Nov. 20, 2017, now Pat. No. 11,243,022.

(52) U.S. Cl.
CPC .... *F25D 2201/14* (2013.01); *F25D 2323/024* (2013.01)

(58) Field of Classification Search
CPC ....... E05D 7/081; E05D 7/02; E05Y 2900/31; E05Y 2600/626; E05Y 2900/302
See application file for complete search history.

(56) References Cited

U.S. PATENT DOCUMENTS

| | | | |
|---|---|---|---|
| 3,430,386 | A | 3/1969 | Sandin et al. |
| 4,610,489 | A | 9/1986 | Dibert, Jr. et al. |
| 4,774,740 | A | 10/1988 | Gidseg et al. |
| 4,864,691 | A | 9/1989 | Gidseg et al. |
| 5,040,857 | A | 8/1991 | Mandel et al. |
| 5,187,837 | A | 2/1993 | Gunderson et al. |
| 5,265,954 | A | 11/1993 | Keil |
| 5,687,509 | A | 11/1997 | Barreoro et al. |
| 5,931,554 | A | 8/1999 | Koopman |
| 5,960,518 | A | 10/1999 | Jeong |
| 6,446,396 | B1 | 9/2002 | Marangoni et al. |
| 7,322,209 | B2 | 1/2008 | Hwang et al. |
| 8,162,415 | B2 | 4/2012 | Hägele et al. |
| 8,162,421 | B2 | 4/2012 | Lim et al. |
| 8,307,502 | B2 | 11/2012 | Bonomie et al. |
| 8,382,219 | B2 | 2/2013 | Hottmann et al. |
| 9,212,846 | B2 | 12/2015 | Lee et al. |
| 9,221,210 | B2 * | 12/2015 | Wu ........................ B29C 51/02 |
| 9,383,135 | B2 | 7/2016 | Park et al. |
| 10,197,326 | B2 | 2/2019 | Son et al. |
| 10,260,261 | B2 | 4/2019 | Reuter et al. |
| 10,501,971 | B2 | 12/2019 | Zhang et al. |
| 10,697,694 | B2 | 6/2020 | Steiger et al. |
| 10,876,333 | B2 | 12/2020 | Zhang et al. |
| 10,995,542 | B2 | 5/2021 | Tezon |
| 11,289,081 | B2 | 3/2022 | Asada et al. |
| 2002/0009903 | A1 | 1/2002 | Malnati |
| 2003/0014941 | A1 | 1/2003 | Mazza |
| 2005/0284159 | A1 | 12/2005 | Kim |
| 2007/0246945 | A1 | 10/2007 | Chiang |
| 2008/0048539 | A1 | 2/2008 | Beek et al. |
| 2008/0104797 | A1 | 5/2008 | Chung et al. |
| 2008/0168618 | A1 | 7/2008 | Hottmann |
| 2009/0031634 | A1 | 2/2009 | Glanz et al. |
| 2012/0025686 | A1 | 2/2012 | Darney |
| 2012/0096734 | A1 | 4/2012 | Moon et al. |
| 2015/0054396 | A1 | 2/2015 | Trulaske, Sr. |
| 2015/0059126 | A1 | 3/2015 | Dubina et al. |
| 2016/0047152 | A1 | 2/2016 | Suarez Gonzalez |
| 2016/0201975 | A1 | 7/2016 | Bazzucchi |
| 2016/0252291 | A1 | 9/2016 | Kikuchi et al. |
| 2017/0081891 | A1 | 3/2017 | Thielmann et al. |
| 2017/0135498 | A1 | 5/2017 | Windrich |
| 2017/0167173 | A1 | 6/2017 | Johnson |
| 2020/0152192 | A1 | 5/2020 | Asada et al. |

* cited by examiner

REFRIGERATOR WITH HINGE ASSEMBLY HAVING AN EXTERNAL HINGE PIN

CROSS-REFERENCE TO RELATED APPLICATIONS

This application is a continuation of U.S. patent application Ser. No. 18/202,367, filed on May 26, 2023, now U.S. Pat. No. 11,976,874, entitled "REFRIGERATOR WITH HINGE ASSEMBLY HAVING AN EXTERNAL HINGE PIN," which is a divisional of U.S. application Ser. No. 17/592,180, filed on Feb. 3, 2022, now U.S. Pat. No. 11,662,137, entitled "REFRIGERATOR WITH HINGE ASSEMBLY HAVING AN EXTERNAL HINGE PIN," which is a continuation of U.S. application Ser. No. 16/765,720, filed on May 20, 2020, now U.S. Pat. No. 11,243,022, entitled "REFRIGERATOR WITH HINGE ASSEMBLY HAVING AN EXTERNAL HINGE PIN," which is a National Stage Application under 35 U.S.C. § 371 of International Application No. PCT/US2017/062576, filed on Nov. 20, 2017, entitled "REFRIGERATOR WITH HINGE ASSEMBLY HAVING AN EXTERNAL HINGE PIN," the entire disclosure of which is hereby incorporated herein by reference.

BACKGROUND

The present device generally relates to a refrigerator with a hinge assembly for hinging a door to a cabinet, and more specifically, to a hinge assembly in which a hinge pin is provided external to the door.

SUMMARY

According to one aspect of the present disclosure, a refrigerator includes a cabinet and a door with an exposed door frame that extends at least partially about a top panel and opposing side panels of the door. At least one hinge assembly is configured to hinge the door to the cabinet. The at least one hinge assembly includes a mounting block coupled to the top panel. The mounting block is positioned in a cutout of the exposed door frame that is proximate a front panel of the door and is disposed between the opposing side panels. A hinge support bracket is coupled to the cabinet. A hinge bracket is coupled to the hinge support bracket. The hinge bracket includes an upper portion that is vertically offset from a lower portion. A hinge pin is disposed between the mounting block and the upper portion of the hinge bracket.

According to another aspect of the present disclosure, a refrigerator includes a vacuum insulated cabinet, a door, and an upper hinge assembly that is configured to hinge the door to the vacuum insulated cabinet. The upper hinge assembly includes a mounting block that is coupled to a top panel of the door. A hinge support bracket is coupled to the vacuum insulated cabinet. The hinge support bracket extends across the width of the vacuum insulated cabinet. A hinge bracket is coupled to the hinge support bracket. The hinge bracket includes an upper portion that is vertically offset from a lower portion. A hinge pin is disposed between the mounting block and the upper portion of the hinge bracket.

According to yet another aspect of the present disclosure, a hinge assembly for hinging a door to a cabinet of a refrigerator includes a mounting block that is coupled to a top panel of the door and a hinge support bracket that is coupled to the cabinet. The hinge support bracket extends across the width of the cabinet. A hinge bracket is coupled to the hinge support bracket. The hinge bracket includes an upper portion that is vertically offset from a lower portion. A hinge pin is disposed between the mounting block and the upper portion of the hinge bracket.

These and other features, advantages, and objects of the present disclosure will be further understood and appreciated by those skilled in the art upon studying the following specification, claims, and appended drawings.

DETAILED DESCRIPTION OF EMBODIMENTS

Figure 1:
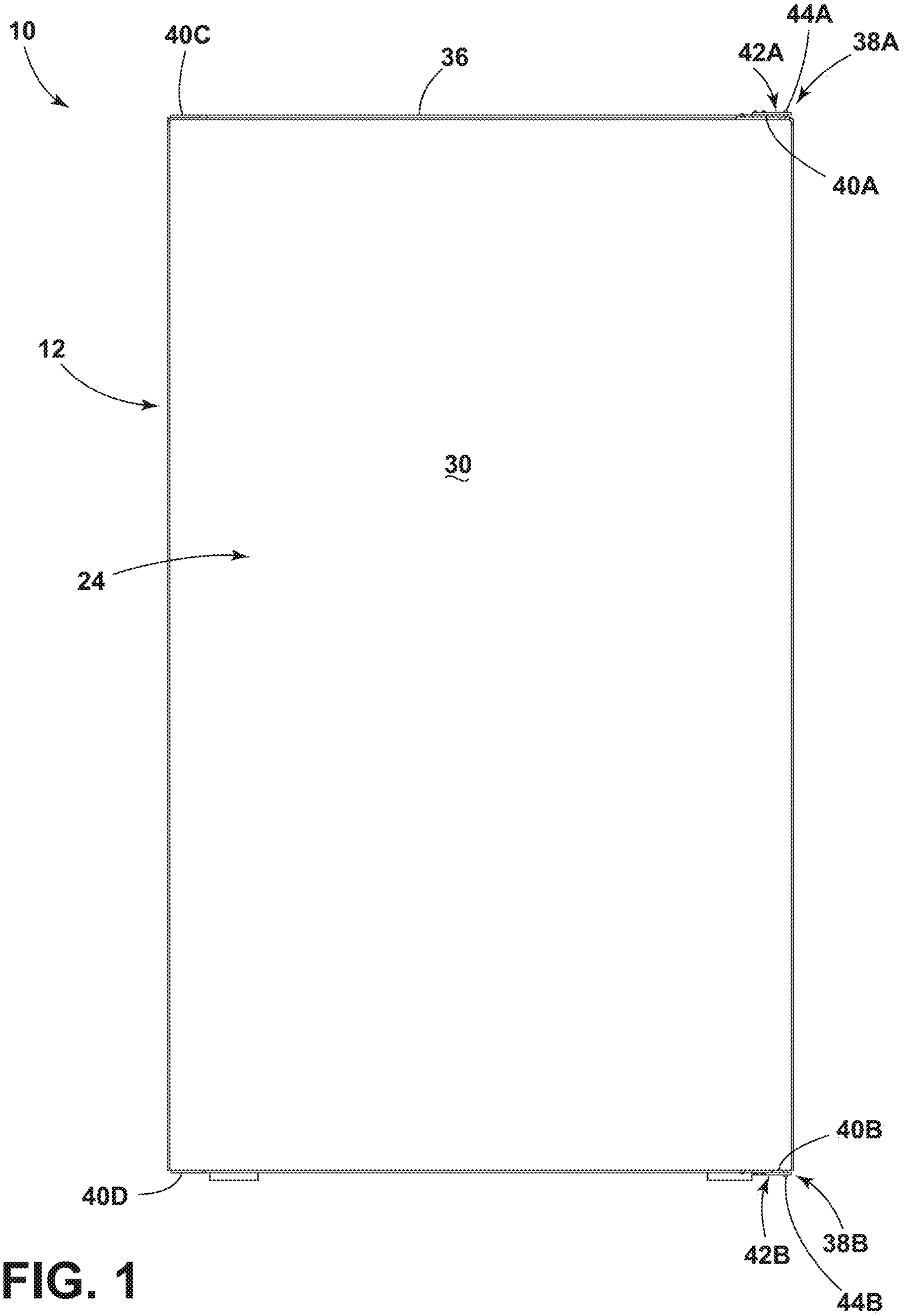
FIG. 1 is a front perspective view of a refrigerator equipped with one or more hinge assemblies configured to hinge a door to a cabinet.
Figure 2:
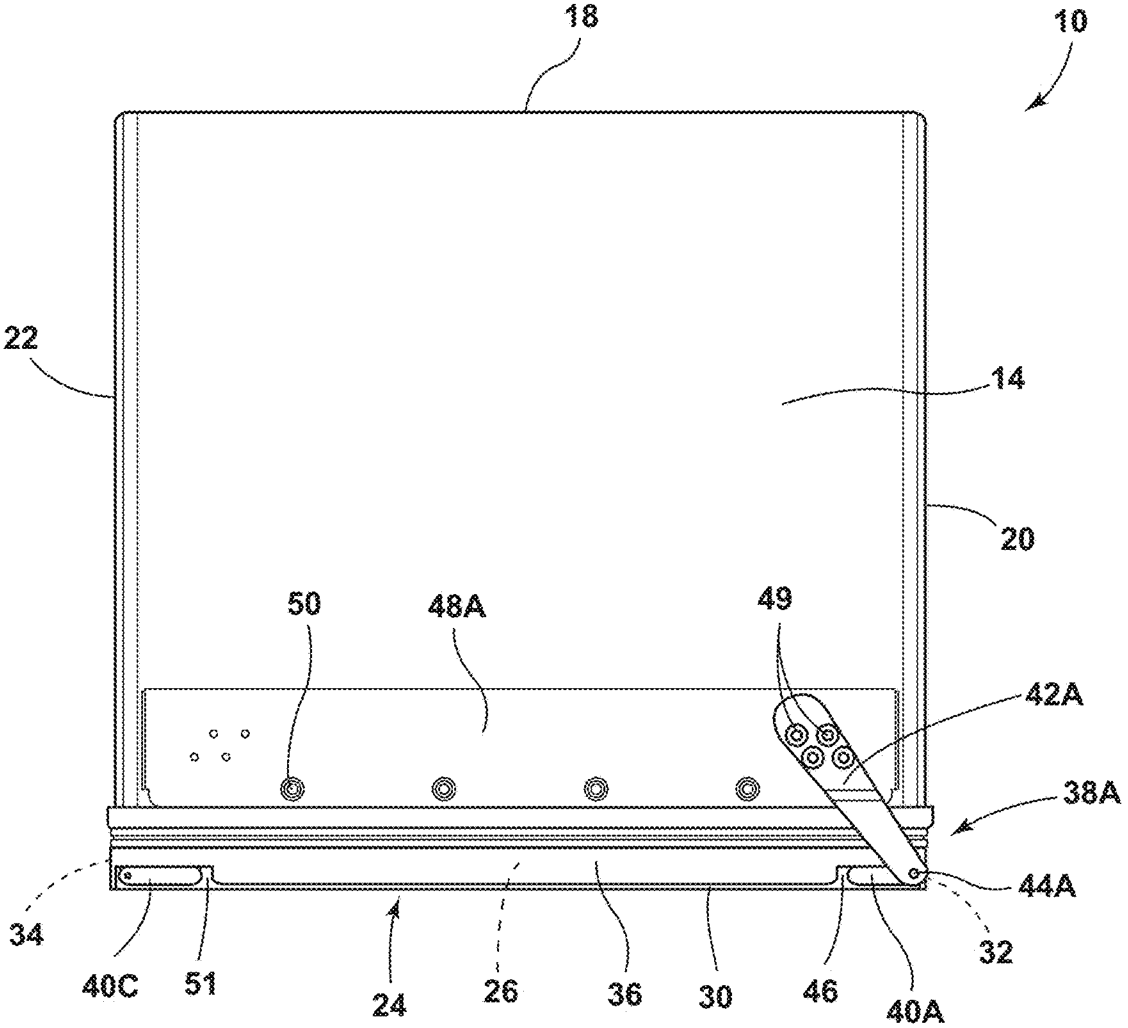
FIG. 2 is a top view of the refrigerator and a first hinge assembly generally provided at a front upper right corner of the refrigerator shown in FIG. 1.
Figure 3:
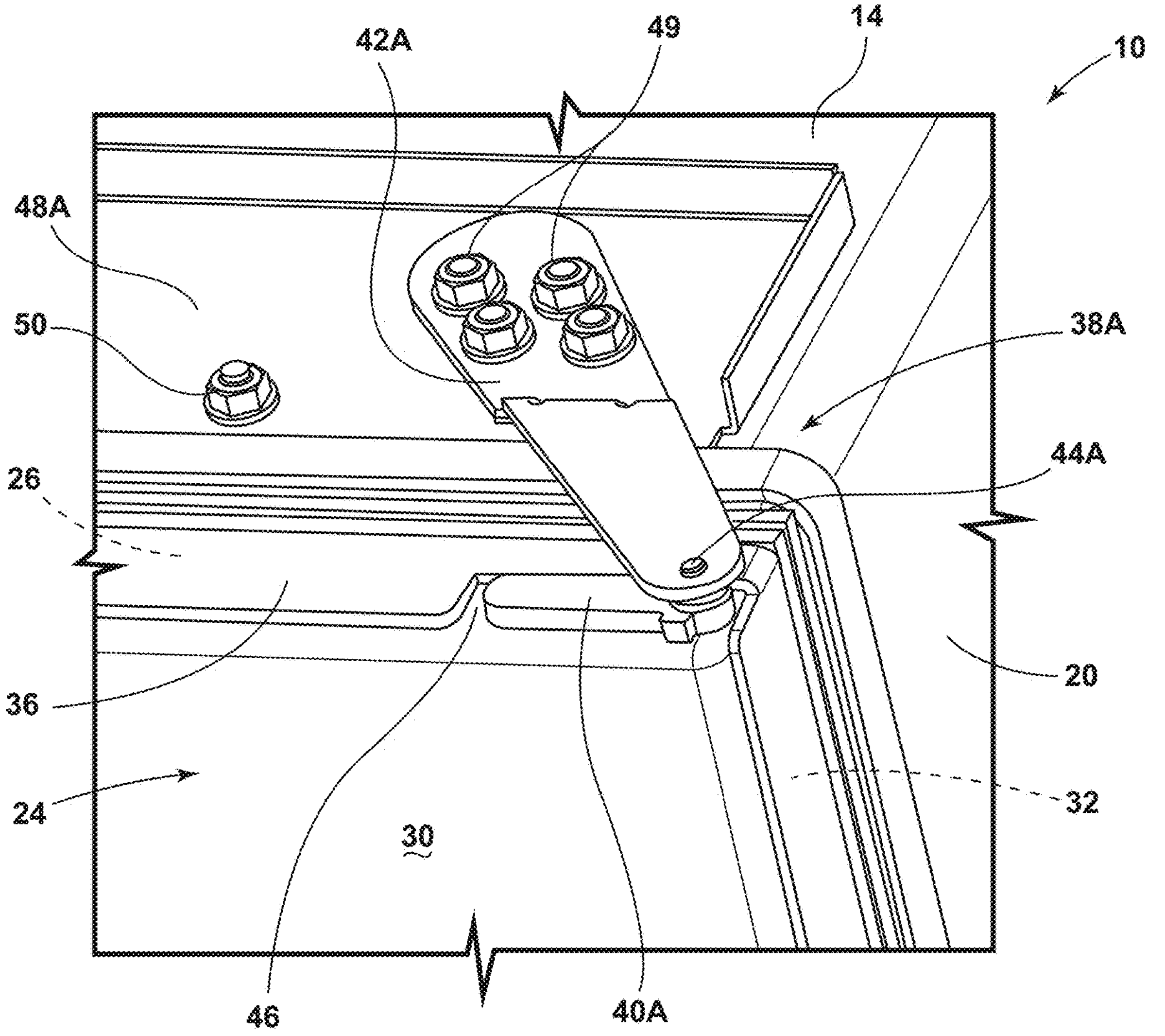
FIG. 3 is a top isometric view of the refrigerator and the first hinge assembly.
Figure 4:
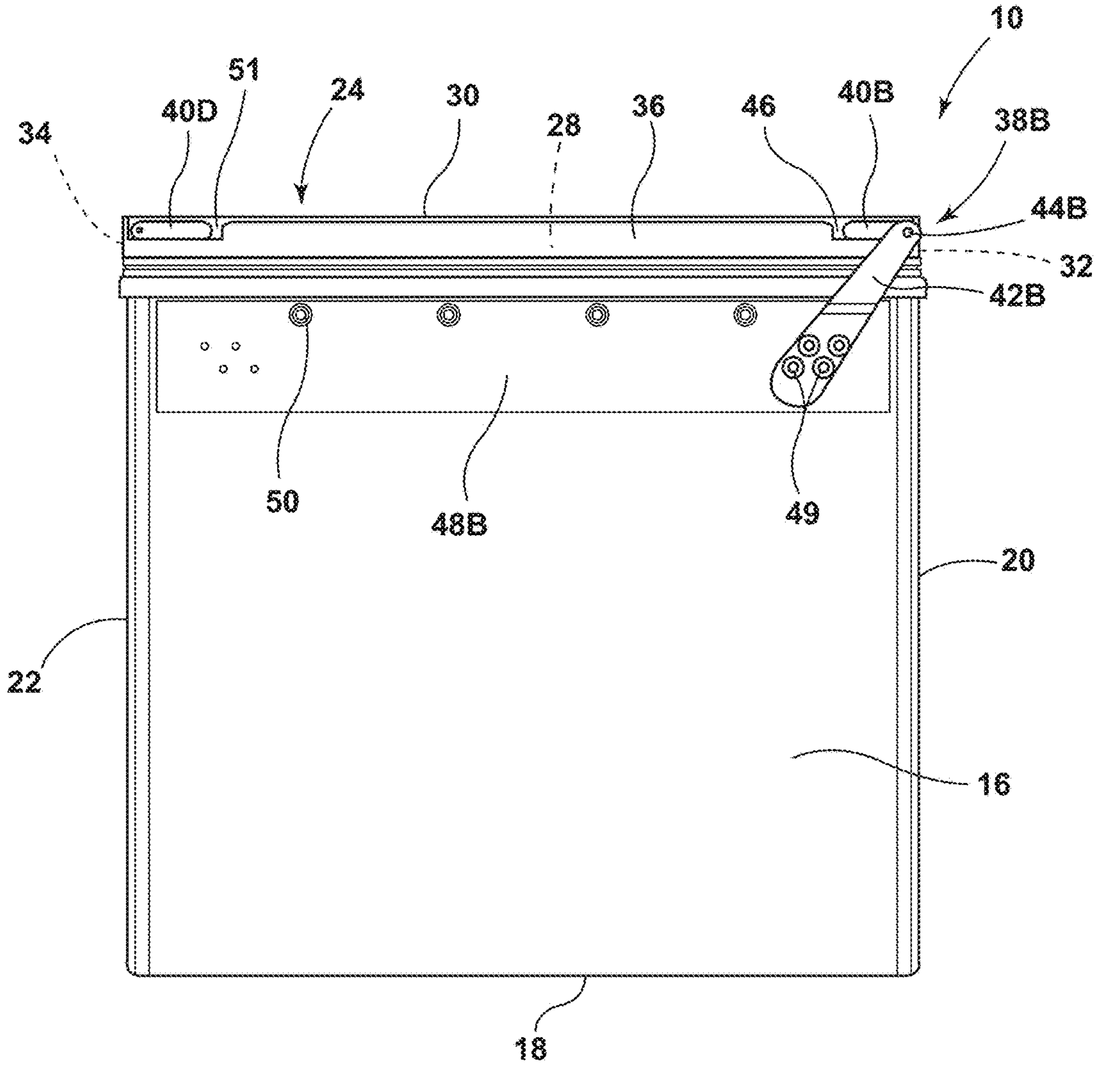
FIG. 4 is a bottom view of the refrigerator and a second hinge assembly generally provided at a front bottom right corner of the refrigerator shown in FIG. 1.
Figure 5:
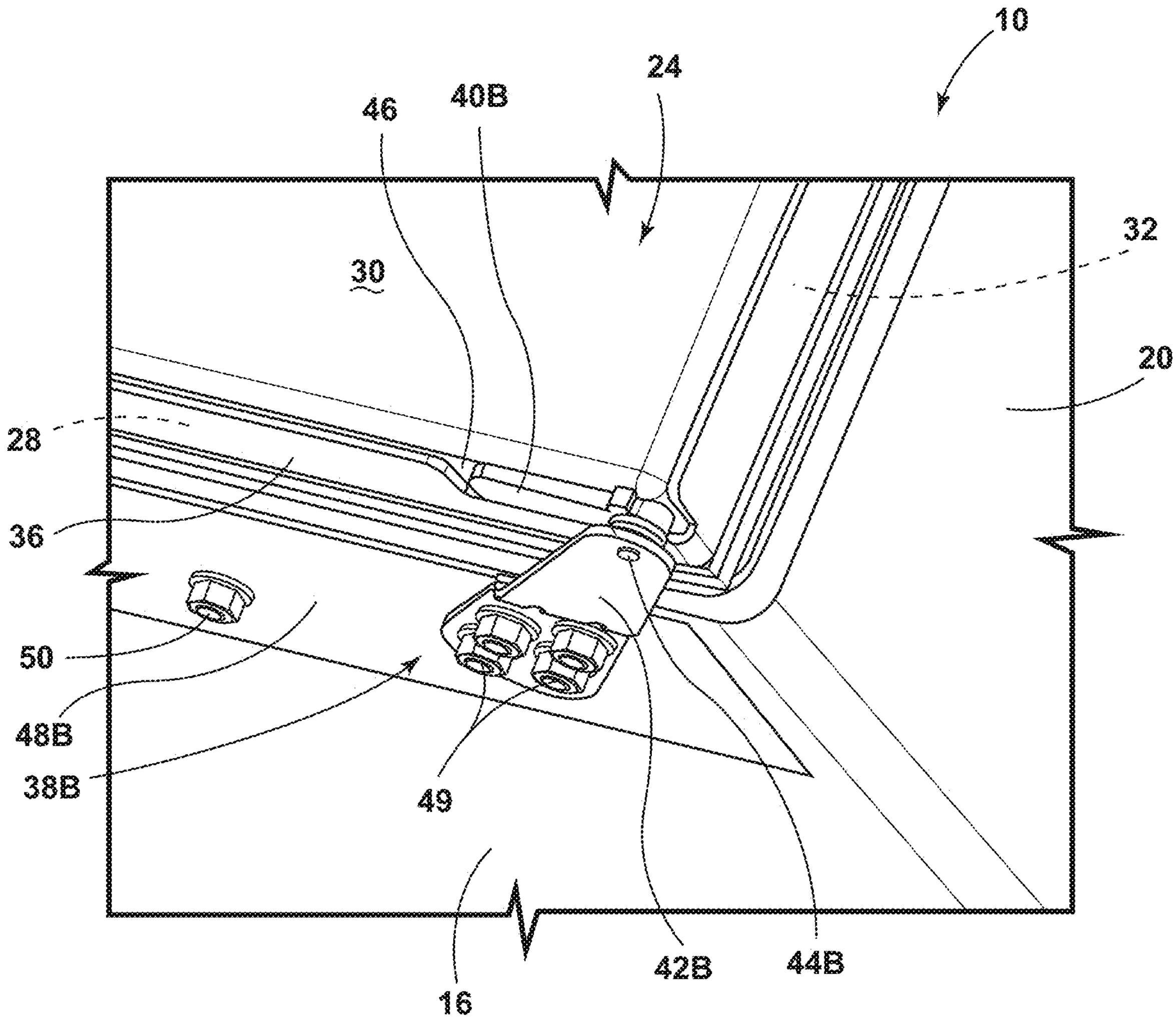
FIG. 5 is a bottom isometric view of the refrigerator and the second hinge assembly.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5, a refrigerator 10 is generally shown as a single door refrigerator. The refrigerator 10 includes a cabinet 12 in which stored items such as food and drink are cooled. The cabinet 12 includes a top panel 14, a bottom panel 16, a rear panel 18, and opposing side panels 20 and 22. A door 24 is hinged to the cabinet 12 and includes a top panel 26, a bottom panel 28, a front panel 30, and opposing side panels 32 and 34 partially enclosed by a door frame 36. The door 24 may include a handle, a recessed grip, or other conventional structure to enable a user to access the contents of the cabinet 12. As is known, the cabinet 12 and the door 24 may define a fresh food compartment and a freezer compartment, and stored items may be placed on shelving or inside drawers provided by the cabinet 12 and/or the door 24. In some embodiments, the cabinet 12 and/or the door 24 may be vacuum-insulated.

The door 24 is hinged to the cabinet 12 using one or more hinge assemblies exemplarily shown as first hinge assembly 38A and second hinge assembly 38B. As depicted, hinge assembly 38A is generally provided at a front upper right corner of the refrigerator 10 and hinge assembly 38B is generally provided opposite hinge assembly 38A at a front bottom right corner of the refrigerator 10. In such a configuration, the door 24 opens and closes in a counterclockwise and clockwise direction, respectively. Hinge assemblies 38A, 38B each include a corresponding mounting block 40A, 40B, hinge bracket 42A, 42B, and hinge pin 44A, 44B.

Mounting blocks 40A and 40B are located at a front right corner of the door 24 and are coupled to respective top and bottom panels 26, 28 of the door 24 through a cutout 46 of the door frame 36. It is contemplated that the mounting blocks 40A, 40B may be welded to the door 24 or otherwise secured thereto. Hinge brackets 42A and 42B are coupled to respective top and bottom panels 14, 16 of the cabinet 12 via a corresponding hinge support bracket 48A, 48B using one or more mechanical fasteners 49 or other coupling means. Hinge support brackets 48A and 48B are directly coupled to the respective top and bottom panels 14, 16 of the cabinet 12 using one or more mechanical fasteners 50 or other coupling means. In alternative embodiments, the hinge brackets 42A, 42B may be directly coupled to the cabinet 12. Hinge pins 44A and 44B are each disposed between a corresponding mounting block 40A, 40B and a corresponding hinge bracket 42A, 42B. The resulting couplings enable the entirety of the hinge pins 44A, 44B to be external to the door 24. Additionally, the hinge pins 44A, 44B are free from having to be directly secured to the door 24. Such an arrangement provides several advantages. For example, by locating the hinge pins 44A, 44B external to the door 24, there is no need to alter the door 24 to provide a recess or other accommodation for receiving the hinge pins 44A, 44B. In embodiments where the door 24 is vacuum-insulated, recesses or other accommodations formed in the door 24 may compromise the vacuum seal of the door 24. Accordingly, the hinge assemblies 38A, 38B described herein may aid in preserving the integrity of vacuum-insulated structures.

Optionally, additional mounting blocks 40C and 40D are located at a front left corner of the door 24 and are provided opposite to mounting blocks 40A and 40B, respectively. The mounting blocks 40C and 40D are coupled (e.g., welded) to respective top and bottom panels 26, 28 of the door 24 through a cutout 51 of the door frame 36. In this way, hinge pin 44A and hinge bracket 42A may be engaged to mounting block 40C and hinge pin 44B and hinge bracket 42B may be engaged to mounting block 40D if desiring to change the direction in which the door 24 is opened and closed, for example, from a counterclockwise and clockwise direction to a clockwise and counterclockwise direction, respectively. The hinge brackets 42A, 42B may be engaged to the corresponding hinge support brackets 48A, 48B or directly engaged to the respective top and bottom panels 14, 16 of the cabinet 12 as described herein.

Figure 6:
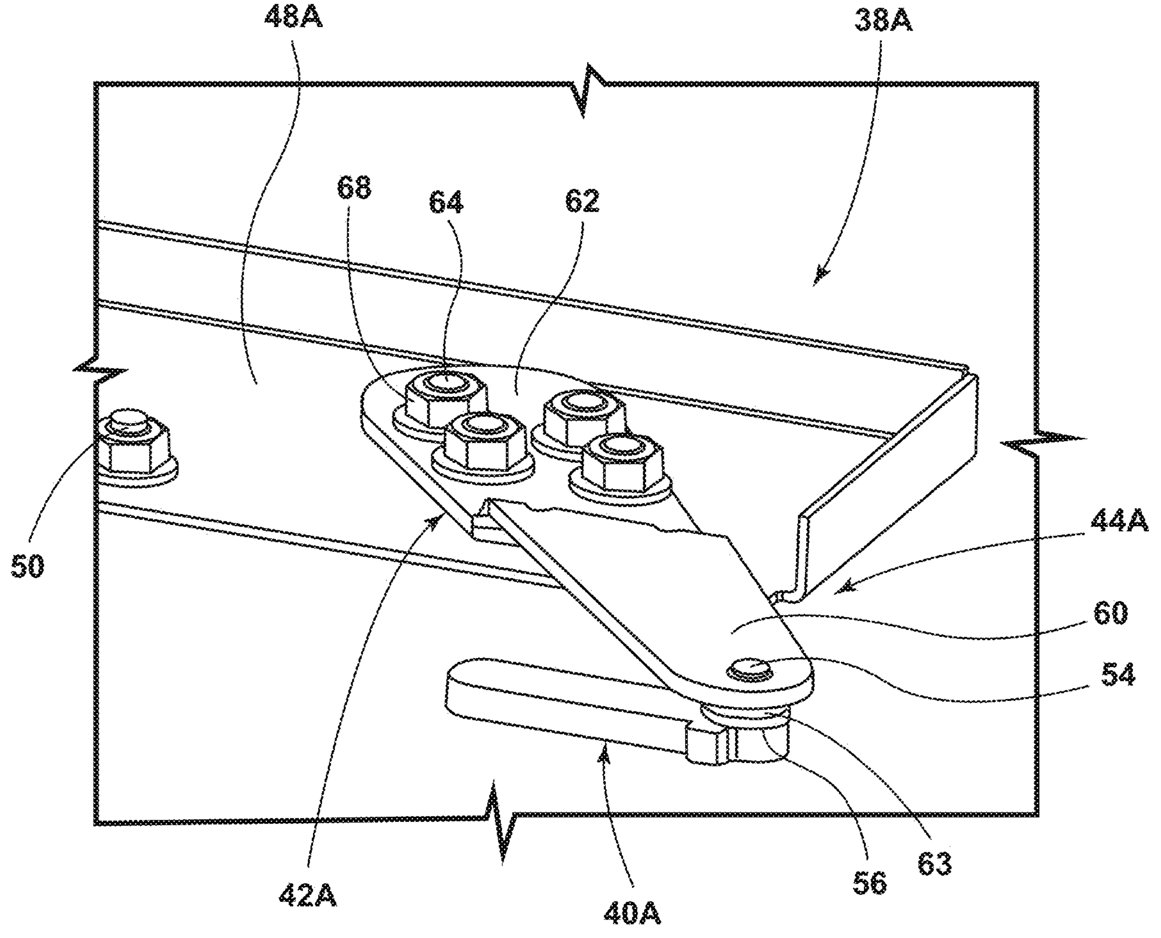
FIG. 6 illustrates the first hinge assembly fully assembled.
Figure 7:
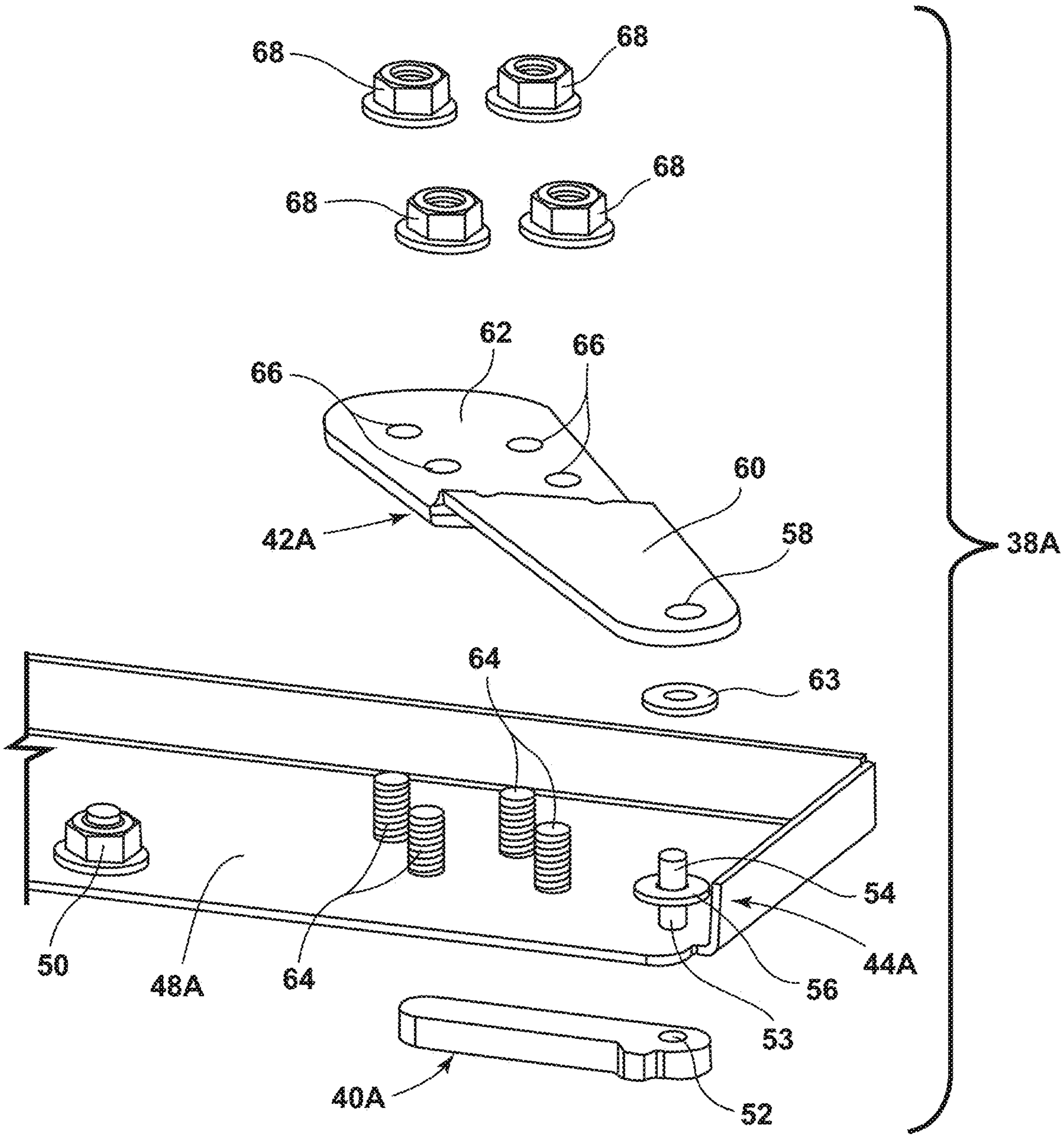
FIG. 7 illustrates an exploded view of the first hinge assembly.

Referring to FIGS. 6 and 7, hinge assembly 38A is shown in greater detail along with an assembly process thereof. It will be understood that hinge assembly 38B is similar to hinge assembly 38A and may be assembled in like fashion. In assembly, mounting block 40A is coupled (e.g., welded) to the top panel 26 of the door 24. In alternative embodiments, mounting block 40A may be engaged to the top panel 26 via mechanical fasteners or other coupling means. Mounting block 40A includes an opening 52 for receiving a lower peg 53 of hinge pin 44A. In the depicted embodiment, hinge pin 44A includes the lower peg 53, an upper peg 54, and a shoulder 56 dividing the lower and upper pegs 53, 54. The upper peg 54 is received in an opening 58 in portion 60 of hinge bracket 42A and a bushing 63 is disposed between the shoulder 56 of hinge pin 44A and portion 60. Portion 60 is vertically offset and cantilevered from portion 62 of hinge bracket 42A. As depicted, portion 60 is raised relative to portion 62, which is engaged to hinge support bracket 48A via one or more weld studs 64 received through corresponding openings 66 in the lower portion 62 and engaged to corresponding hinge nuts 68. It is contemplated that hinge support bracket 48A may be welded to the top panel 14 of the cabinet 12 or engaged thereto using one or more mechanical fasteners 50.

Figure 8:
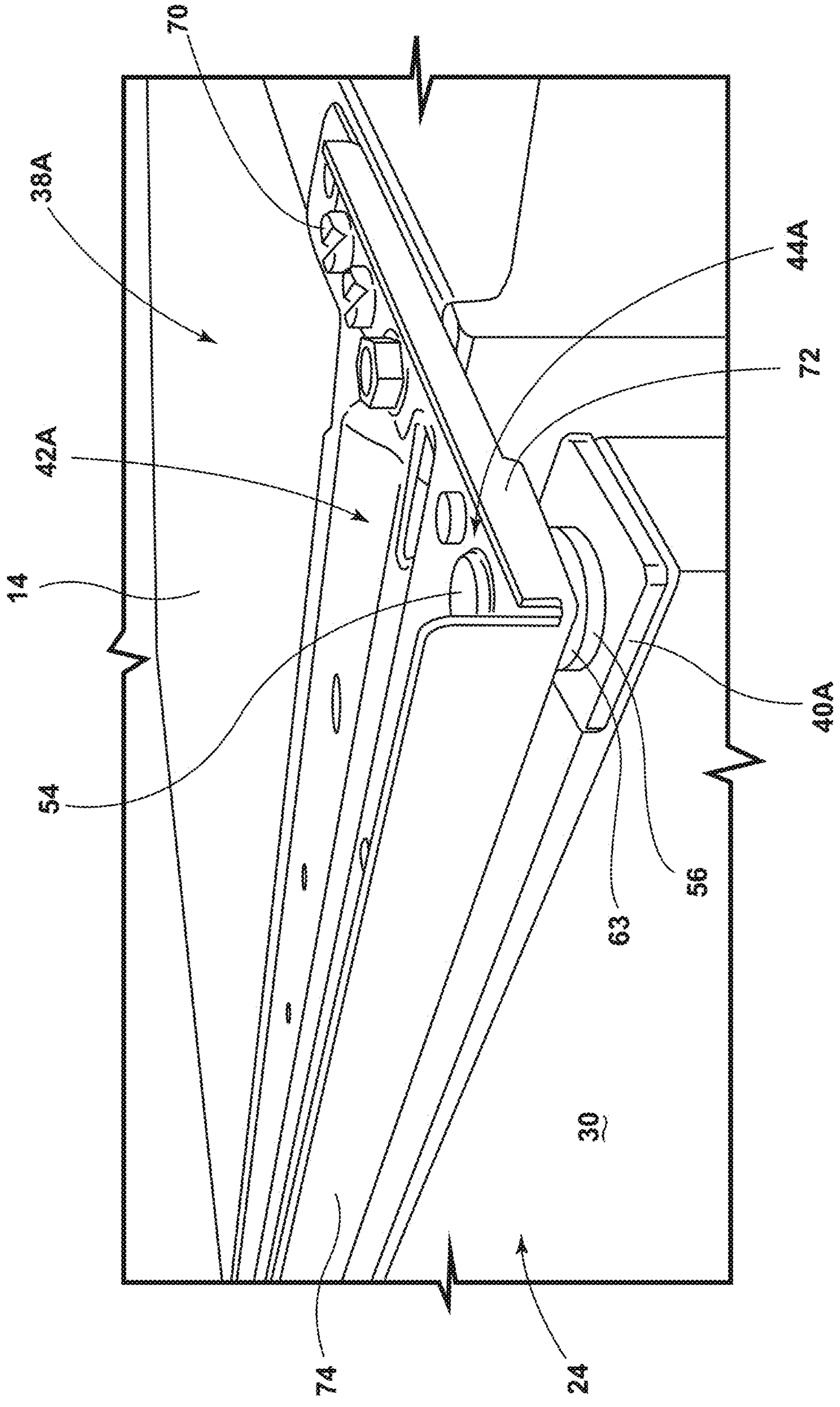
FIG. 8 illustrates an alternative embodiment of the first hinge assembly.

Referring to FIG. 8, hinge bracket 42A of hinge assembly 38A is shown in a planar configuration. Hinge bracket 42A is directly engaged to the top panel 14 of the cabinet 12 via one or more mechanical fasteners 70 or other coupling means. Hinge bracket 42A includes a cantilevered portion 72 engaged to the upper peg 54 of hinge pin 44A and extending over the door 24. Hinge pin 44A may be configured according to any of the embodiments described herein and is further engaged to mounting block 40A, which may be welded to the door 24 or otherwise coupled thereto. In the depicted embodiment, hinge pin 44A is external to the door 24 and the door 24 may be vacuum-insulated. The cantilevered portion 72 includes an upward extending flange 74 that spans a width of the cabinet 12 and is coplanar with the front panel 30 of the door 24. The flange 74 is configured as a cosmetic cover and may be used to conceal a gap 76 between the refrigerator 10 and a cabinetry 78 positioned above the refrigerator 10 as exemplarily shown in FIG. 9.

Figure 9:
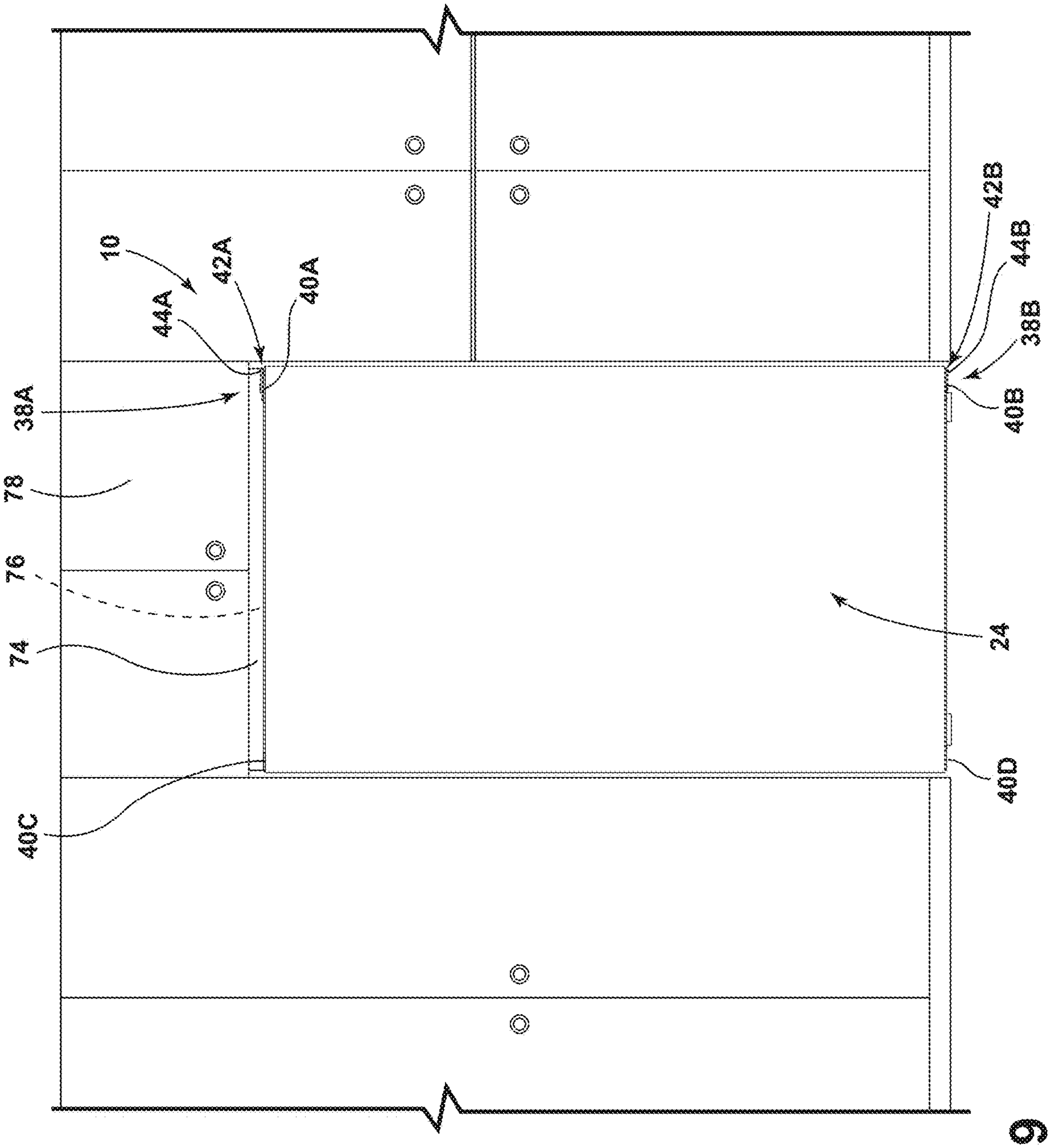
FIG. 9 is a front view of the refrigerator equipped with the hinge assembly shown in FIG. 8.

With respect to the embodiment of FIG. 9, it is contemplated that hinge bracket 42A may be alternatively coupled to mounting block 40C using hinge pin 44A. Likewise, hinge bracket 42B and hinge pin 44B of hinge assembly 38B may be alternatively coupled to mounting block 40D as described previously herein. In this manner, the direction in which the door 24 is opened and closed may be changed from a counterclockwise and clockwise direction to a clockwise and counterclockwise direction, respectively. With respect to the embodiments described herein, the direction in which the door 24 is opened and closed may be set by the manufacturer and later adjusted by the user or other personnel.

It will be understood by one having ordinary skill in the art that construction of the hinge assembly and associated components is not limited to any specific material. Other exemplary embodiments of the disclosure may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the hinge assembly as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The above description is considered that of the preferred embodiments only. Modifications of the hinge assembly will occur to those skilled in the art and to those who make or use the hinge assembly. Therefore, it is understood that the embodiments shown in the drawings and described above are merely for illustrative purposes and not intended to limit the scope of the disclosure, which is defined by the claims as interpreted according to the principles of patent law, including the doctrine of equivalents.

What is claimed is:

1. A hinge assembly for hinging a door to a cabinet of a refrigerator, comprising:

a mounting block coupled to a top panel of said door;

a hinge support bracket coupled to said cabinet, wherein the hinge support bracket and an upwardly extending flange of the hinge support bracket extend across the width of said cabinet;

a hinge bracket coupled to the hinge support bracket, wherein the hinge bracket includes an upper portion vertically offset from a lower portion; and a hinge pin disposed between the mounting block and the upper portion of the hinge bracket, wherein the hinge pin comprises a lower peg, an upper peg, and a shoulder dividing the lower peg and the upper peg.

2. The hinge assembly of claim 1, further comprising:

an exposed door frame extending at least partially about the top panel and opposing side panels of said door.

3. The hinge assembly of claim 2, wherein the mounting block is positioned in a cutout of the exposed door frame.

4. The hinge assembly of claim 1, wherein the hinge pin engages the mounting block and the upper portion of the hinge bracket such that an entirety of the hinge pin is external to said door.

5. The hinge assembly of claim 1, wherein the upper portion of the hinge bracket defines an opening configured to receive the hinge pin.

* * * * *